Dec. 8, 1959     K. I. SELIN     2,916,689
SATURABLE CORE REACTOR REGULATORS
Filed Sept. 23, 1955     2 Sheets-Sheet 1
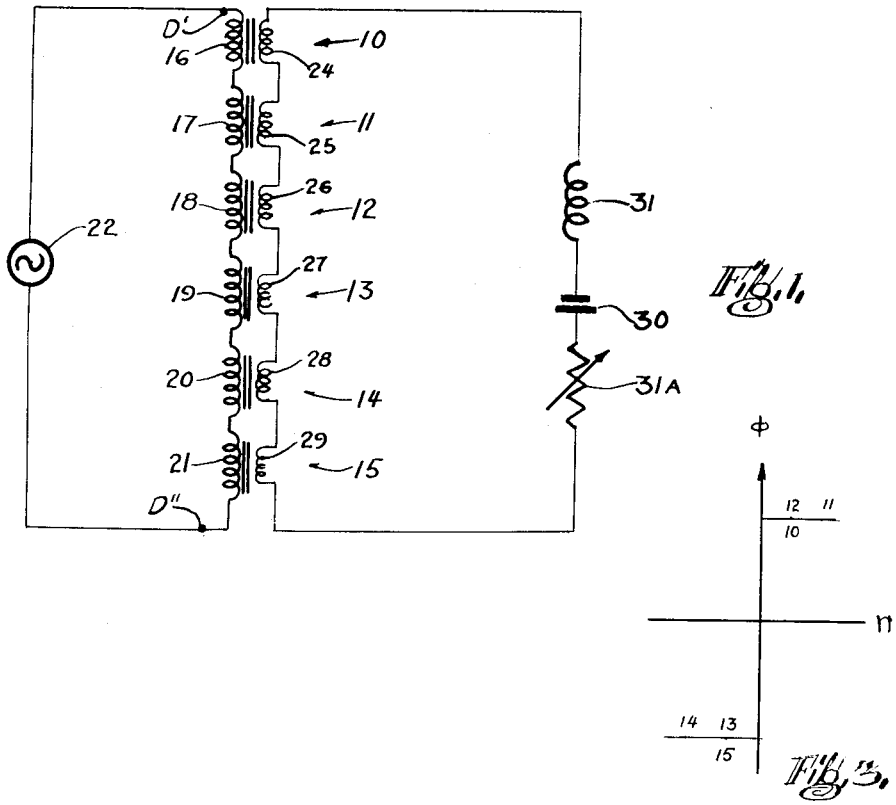
INVENTOR
KARL I. SELIN
BY
Pollard Johnston Smythe & Robertson
ATTORNEYS

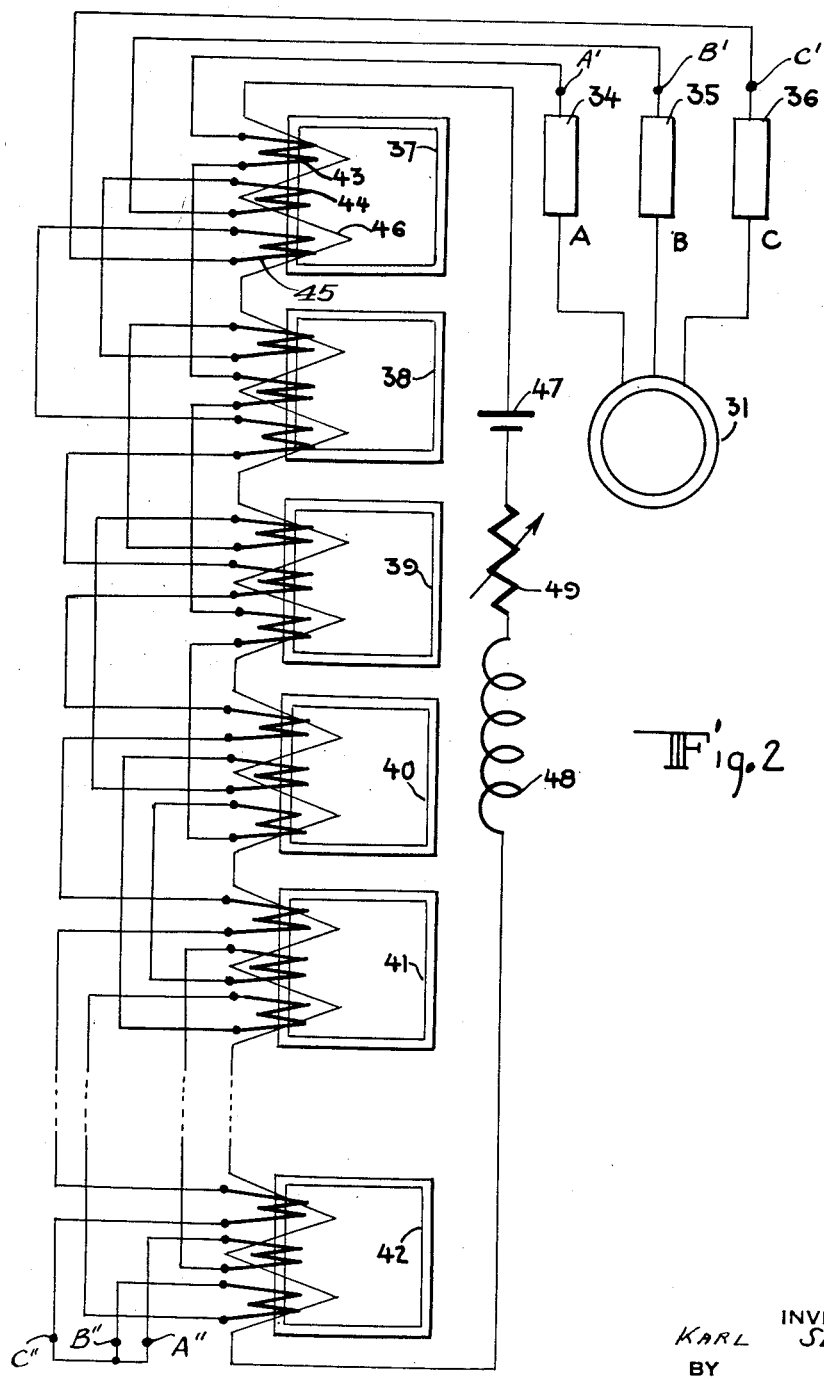

United States Patent Office 2,916,689
Patented Dec. 8, 1959

2,916,689

SATURABLE CORE REACTOR REGULATORS

Karl I. Selin, Brookline, Mass., assignor, by mesne assignments, to Basic Products Corporation, Milwaukee, Wis., a corporation of Wisconsin Application September 23, 1955, Serial No. 536,156

4 Claims. (Cl. 323—89)

This invention relates to an adjustable circuit for providing predetermined load current wave forms, the circuit including saturable reactor elements arranged in a particular manner.

When using saturable reactor elements for controlling load power or for other purposes, the load current wave form in previous arrangements has been undesirably distorted. It is necessary in many circuit systems to provide an arrangement which is adjustable linearly without distortion and which has a predetermined wave form, such as sinusoidal.

One of the objects of the invention is to provide an adjustable alternating current system which has substantially distortionless current wave form characteristics, such being particularly useful for heavy power control.

A further object of the invention is to provide an arrangement which is economical and has the power handling capabilities of the same copper and core material if used as a transformer.

A still further object of the invention is to provide an alternating current load system which can be basically adjusted by a direct current control current wherein the harmonic distortion can be selected.

A still further object of the invention is to provide a regulating arrangement which can be adjusted rapidly without movement of heavy parts.

The invention can be used for numerous purposes such as controlling flow of active or reactive power to a separate load or as an adjustable reactive power load. The separate load can be in series or parallel with the reactor units.

In one aspect of the invention, saturable reactor units are used having windings suitably connected to load means. The load or primary windings may have control windings associated therewith and with a magnetic core. As will be explained hereafter, the turns ratio of the various windings and the core areas are related so that as an A.-C. voltage wave in the supply cycle is applied, the reactor units will desaturate in a predetermined manner so as to produce the desired wave form. The reactor units may consist of transformer-type cores and winding materials. Three or more interconnected units are employed as needed to produce the desired results. The term "phase group" when used herein refers to the elements of a particular phase, e.g. "the load windings of a phase group."

When used in a single phase arrangement, the load windings of the selected reactor units can be connected in series or parallel with the separate load, the control windings being connected with a source of direct current, the latter being variable if desired. The turns ratio of the various elements can be chosen so that the desired steps over a cycle in the load current wave form will be provided to produce a sinusoidal or other type of wave. The half cycle of line frequency can be divided into a number of predetermined periods equal to the number of cores chosen. During any one period, one core is unsaturated, the rest saturated, so that the unsaturated core absorbs the applied A.-C. voltage over that period. As it absorbs the A.-C. voltage, the core flux passes from minus saturation to plus saturation, or the reverse. The cores will unsaturate in a prescribed sequence over the cycle as determined by the individual winding-turns ratios.

As a core is unsaturated, it can be considered to act as a two-winding transformer to force the A.-C. line current to be related to the D.-C. control current by the winding-turns ratio of that core. The turns ratios are so selected that the line current over a cycle is made up of a series of steps which approximate a sine wave or any other predetermined wave form arbitrarily chosen.

In case the units are to be employed in a poly-phase arrangement, such as three-phase, a plurality of units can be provided, in this case each of the reactor units usually having three load or primary windings and one control winding associated with a core. The windings may have different turns ratios and may be connected in such a manner that a sinusoidal or selected wave form will be maintained in the respective load circuits. The number of load windings per core will depend upon the number of phases involved. Also, it is possible to use combinations where one of the cores can have the control winding omitted.

In this arrangement, it can be considered that the three-phase cores are unsaturated two at a time, but do not necessarily saturate or unsaturate simultaneously. Each interval of unsaturation exists over a finite period of the cycle. With two cores unsaturated at the same time, the three-phase voltages are simultaneously absorbed over that period. As the cores unsaturate, they act as transformers and impose upon their windings and ampere-turn balance requirement. The windings can be designed so that the line currents approximate in steps a prescribed poly-phase wave form of the same periodicity as the line voltage.

These and other objects, features, and advantages of the invention will become apparent from the following description and drawings, which are merely exemplary.

In the drawings:

Fig. 1 is a schematic wiring diagram showing utilization of the invention in a single phase arrangement.

Fig. 2 shows a schematic wiring diagram of a polyphase arrangement, intermediate reactor units being omitted.

Fig. 3 is a schematic magnetization curve.

The invention first will be described in conjunction with a single phase poly-unit reactor. For this example, six units, 10, 11, 12, 13, 14 and 15 are illustrated. These units have load or primary windings 16, 17, 18, 19, 20 and 21 respectively, these windings being connected in series with a source of A.-C. 22. Control windings 24, 25, 26, 27, 28 and 29 may be connected in series with a source of control direct current 30, an inductor 31 being included in the D.-C. control circuit. The control current can be arranged to be adjustable such as by an adjustable resistance 31A. The end terminals of the load winding of the phase group are indicated as D' and D".

By employing predetermined turns ratios in the various reactor units, a stepped wave form approaching closely that of a sinusoidal wave can be obtained. Change in the value of the control current will produce proportionate changes in the current steps, such change not changing the overall wave form.

The reactors are constructed and related to each other such that only one reactor unit at a time will become unsaturated and thus relate the load and control currents to each other, the units being arranged so that they will unsaturate automatically in a predetermined order or manner. As the units of the series become successively unsaturated, the load current is forced to change in steps in such a manner as to fulfill the required ampere turn balance of the temporarily unsaturated reactor; $i=nI_c$; in each interval.

$n=$turns-ratio of temporarily unsaturated unit
$I_c=$control current

It can be seen that the changing turns ratios, $n$, of successively unsaturated reactors or units operate as a modulator of the control current. Various current wave forms can be obtained by proper choice of turns ratios of the load and control windings and core areas of the various units, the final current wave form consisting of a plurality of steps of current which in a half cycle will equal the number of reactor units. It is for this reason that the number of reactors used should be chosen to produce a wave form having the desired form, which may include an accepted amount of ripple.

If reactor cores having identical core areas are used, the number of turns of the reactor windings can be determined as set forth hereafter. As an example, in order to obtain the closest approximation to a sinusoidal load current with a six unit reactor as seen in Fig. 1, the A.-C. windings of the units should have the following number of turns:

$$N_a \cos 15°; \; N_a \cos 45°; \; N_a \cos 75°$$

The control windings on said units then should have the following number of turns:

$$N_c \sin 30°; \; N_c \sin 90°; \; N_c \sin 150°$$

The above would apply, for example, to units 10, 11 and 12 of Fig. 1. Units 13, 14 and 15 should have identical windings with those just mentioned, but the control windings will be arranged with opposite polarity.

The variable $N_a$ can be determined by the relation $$N_a = \frac{E}{\omega \phi_s} \sin 15°$$

(MKS—units)

$E=$peak value of applied voltage
$\phi_s=$saturation flux

The variable $N_c$ will determine the current gain $G$ wherein:

$$G = \frac{4N_c}{\pi N_a}$$

The relations can be determined in the case of an arbitrary number of units $p$ having equal core areas as follows:

$$N_a \cos \frac{\pi}{2p}$$

$$N_a \cos \frac{3\pi}{2p}$$

$$- - - -$$

$$N_a \cos \left(\frac{\pi}{2} - \frac{\pi}{2p}\right)$$

The control windings may be set forth as follows:

$$N_c \sin \frac{\pi}{p}$$

$$N_c \sin \frac{3\pi}{p} \; \ldots \; N_c \sin \left(\pi - \frac{\pi}{p}\right)$$

The load current then can be shown to have the following steps:

$$\frac{2N_c I_c}{N_a} \sin \frac{\pi}{p} \; \frac{2N_c I_c}{N_a} \sin \frac{3\pi}{p} \; \ldots \; \frac{2N_c I_c}{N_a} \sin \left(\frac{\pi}{2} - \frac{\pi}{2p}\right)$$

$$N_a = \frac{E}{\omega \phi_s} \sin \frac{\pi}{2p}$$

$$N_c = \frac{\pi}{4} N_a G$$

and $$G = \frac{\text{half wave average load current}}{\text{control current}}$$

In the operation of the above arrangement, the cycle of line frequency has been divided into a number of predetermined periods equal to twice the number of cores. During any one period, one core will be unsaturated, the rest being saturated. As a result, the unsaturated core will absorb the applied A.-C. voltage during that period. As it absorbs said A.-C. voltage, the core flux thereof during said period will pass from a plus saturation to a minus saturation, or vice versa. The cores will unsaturate in a prescribed sequence over the cycle, the sequence being determined by the individual winding turns ratios. Thus, each of the reactor units will become unsaturated during a predetermined period of each cycle, its flux being reversed during each of said periods.

As an example, in the arrangement of Fig. 1, the control current magnetization of units 10 to 15 is shown in Fig. 3, the units unsaturating in the order of

12—11—10—10—11—12—13—14—15—15—14—13 each for a length of time for 15°. As previously mentioned, as each core becomes saturated, it will act similar to a two winding transformer and force the A.-C. load or line current to be related to the D.-C. control current by the winding turns ratio of the particular core concerned. A control circuit inductor 31 should be employed so as to keep the control current substantially constant.

The aforementioned operation also could be accomplished by use of reactor units having unequal core areas. In such an instance, if $A_v$ is the core area of unit $v$, the A.-C. winding $N_{av}$ of unit $v$ should then have the following number of turns:

$$N_{av} = \frac{E}{A_v \omega B_s} \sin \left(\frac{2\pi}{p}\right) \cos \left[(2v-1)\frac{\pi}{2p}\right]$$

where $v = 1, 2, 3 \ldots \frac{p}{2}$ and for approximately sinusoidal load current, the control windings of unit $v$ should have the following number of turns:

$$N_{cv} = \frac{G \pi E}{4 A_v \omega B_s} \sin \left(\frac{2\pi}{p}\right) \sin \left[(2v-1)\frac{\pi}{p}\right]$$

wherein $B_s=$saturation flux density
$\omega=$angular line frequency
$E=$peak voltage In the event the invention is to be used for control of a poly-phase system, such as, for example, a three-phase star or delta connection, the phase windings involved suitably can be connected to form a poly-phase arrangement. The control windings are series connected to the control circuit having a D.-C. source. An inductor may be included so as to assure a substantially ripple-free control current.

Referring to Fig. 2, a source of three phase alternating current is connected through loads 34, 35, 36 to reactor units 37, 38, 39, 40, 41, and 42, units $v$ (not shown) and 42 being arbitrary reactor units. At least three units should be provided. For obtaining sinusoidal wave form, it is preferable to use a larger number of units, such as, for example, twelve units. In the drawing, dotted lines indicate the omitted units, these being omitted for clarity.

Each of the units may have a magnetic core upon which there are three windings 43, 44, 45, one for each phase, and control winding 46. All of the control windings may have the same number of turns and each of the phase windings on a core, a different number of turns. As will be seen in Fig. 2, the phase windings can be connected in a predetermined relationship so as to produce for three phase sinusoidal current, the desired wave forms. The end terminals of the various load windings of the phase groups of phases A, B and C are indicated as A′, A″; B′, B″; C′, C″; respectively.

Merely as an example, the winding $n_{Av}$ of phase A on a unit $v$ may have the following number of turns:

$$N_{Av} = N \cos\left((2v-1)\frac{\pi}{p}\right)$$

$P$ = number of units

A negative number of turns indicates that the particular winding enters the series connected phase winding with a reversed polarity. The winding $n_{Bv}$ of phase B on unit $v$ will have the following number of turns:

$$N_{Cv} = N \cos\left(\frac{2\pi}{3} - (2v-1)\frac{\pi}{p}\right)$$

The third phase C A.-C. winding on unit $v$ may have the following number of turns:

$$n_{Cv} = N \cos\left[\frac{4\pi}{3} - (2v-1)\frac{\pi}{p}\right]$$

A source of D.-C. 47 can be connected through control inductor 48, which may also include control resistor 49.

Describing the operation of Fig. 2, the arrangement is such that there will never be more than two reactors units unsaturated at the same time. When two units are unsaturated at the same time, the three-phase voltages will be simultaneously absorbed by said units. Most of the units will be at positive saturation, which may be termed positive units, and some may be at negative saturation, which may be called negative units. One of the two unsaturated units can be considered to be in transition from a positive to a negative unit, the second unit will be in transition from a negative to a positive unit. After a unit has joined the other negative units, it will remain as a negative unit for a predetermined period of time, such that the time between the instant said unit starts its transition from positive to negative saturation and the instant it starts the reverse thereof is measured by $\phi$ electrical radians.

The value of $\phi$ will depend upon the magnitude of the reactor phase voltage. The following relationship can be derived $\phi_s$ being the saturation flux:

$$E \sin\frac{\pi}{p} = 2\phi_s \omega N \sin\frac{\phi}{2}$$

The reactor units will change from positive to negative units in the order of the subsequent numbers 37, 38, 39, 40, 41 . . . 42. Likewise, the units will return or reverse to positive units in the same order. As an example and illustration, in a twelve unit reactor in which the units are numbered 1 to 12 the numbers of the two unsaturated units during certain of the time intervals are indicated in the following table for two value of $\phi$.

| | | | | | | |
|---|---|---|---|---|---|---|
| $\varphi = 90°$ | 3 | 4 | 5 | 6 | 7 | 8 |
| | 6 | 7 | 8 | 9 | 10 | 11 |
| $\varphi = 150°$ | 2 | 3 | 4 | 5 | 6 | 7 |
| | 7 | 8 | 9 | 10 | 11 | 12 |
| From $\omega t =$ | 15° | 45 | 75 | 105 | 135 | 165 |
| To $\omega t =$ | 45 | 75 | 105 | 135 | 165 | 195 |

In the load current relationship, alternating currents necessary for ampere turns balance of the unsaturated units will be proportional to the control current but such also will depend upon the value of $\phi$. Since $\phi$ will be a function of the applied voltage, the load current will be a function of the control current and the reactor voltage. In conventional saturable reactors having high control circuit impedance, the average load current is a function only of the control current. For the poly-unit polyphase system, the following expression for the load current $i_A$ of phase A can be derived.

$$i_A = -\frac{N_c I_c}{1.5N \cos\frac{\varphi}{2}} \epsilon^{-s}\left[(2\alpha-1)\frac{\pi}{p} + \frac{\varphi}{2}\right]$$

wherein, $N_c$ is the number of control winding turns, $I_c$ is the control winding current, and where $\alpha$ is the number of the unsaturated unit with a positive flux derivative.

The per-unit incremental reactance of the saturable reactor is greater than unity for $\phi$ less than 90° and less than unity for $\phi$ larger than 90°. Thus, a reactor operating with $\phi$ less than 90° will tend to keep a constant load current, while a reactor operating with $\phi$ larger than 90° will tend to maintain a constant reactor voltage. In the control circuit, it has been found desirable to have an energy storage element such as an inductor. The reason for this is that in switching units in and out of saturation, some load current harmonics may be caused with a resultant exchange of harmonic power between the load and control circuits. Peak energy stored by the supply voltage in the control circuit may be expressed by $$u_c = \frac{\pi^2}{2\omega p^2} \cdot 3 \cdot \frac{E}{\sqrt{2}} \cdot \frac{I}{\sqrt{2}}$$

$u_c$ = peak energy stored and where E and I are the peak phase voltage and currents, respectively.

The time response of the system is rapid and will depend upon the type of load. Where the arrangement is a variable load of reactive power only, the time response will be limited only by the external control circuit. If the system is used as a controller of active power, a short time is required for the reactor to adjust itself to the new terminal voltage associated with change of control and load currents.

Inasmuch as the rated power of the reactor unit is approximately the same as the rated power of a transformer employing the same cores, the copper losses of the reactor will percentagewise be approximately the same as for an equivalent transformer. The copper losses of a transformer are in the order of 0.5–2% depending upon the size of the transformer, the copper losses of a single winding being proportional to the number of ampere turns of the winding. Hence, in a magnetic structure used as a two-winding transformer, the copper losses will be equally divided between primary and secondary windings since there is an ampere turns balance. In the reactor unit used in Fig. 2, one D.-C. winding controls the current of three A.-C. windings resulting in considerably less D.-C. ampere turns than A.-C. ampere turns so that only a small part of the overall copper losses will be concentrated in the control winding. Since the current gain of the reactor is a function of the mode in which the reactor is operating, expressed by the variable $\varphi$, not only the exact rating of the reactor but also the division of copper losses between the A.-C. and the D.-C. windings will be a function of $\varphi$. For a twelve unit reactor (Fig. 2) the ampere turns of the A.-C. windings will be $$\frac{11 N_c I_c}{\cos\frac{\phi}{2}}$$

as compared with 12 $N_c$ $I_c$ for the control windings. Thus, the copper losses of the control windings relative to the overall copper losses will equal:

$$\frac{1}{1 + \dfrac{0.9}{\cos\dfrac{\phi}{2}}}$$

= 0.22 for $\phi = 150°$; 0.36 for $\phi = 120°$; 0.44 for $\phi = 30°$; 0.50 for $\phi = 60°$.

It can be seen that a magnetic structure which as a transformer would have copper losses of 1% would as a polyunit saturable reactor require 0.22% control power ($\varphi = 150°$).

The reactor units can be of a transformer-type construction. The type of core material will influence the magnetizing current, the range of control, the linearity and the load current waveform. Where a sinusoidal current is desirable, common transformer steel has an advantage over the more sharply bent magnetization characteristics of the alloys. The load currents of a reactor using material of idealized magnetic characteristics and with windings of zero air inductance has a $(p-1)$th current harmonic of $$\frac{100\%}{p}$$

amplitude. However, measurements on a 12-unit reactor design using common transformer steel revealed only 2% distortion. In large reactor units, only transformer iron should be used because of cost. The load current wave form of a reactor of a predetermined number of units can be improved by designing the windings such that the required inductance of the control circuit is built into the air inductance of the reactor windings. The air inductance of the saturated units is equivalent to an inductance in series with the reactor, which increases the reactor time response and decreases the current gain. In some applications, such will be acceptable and this method is preferable to breaking up the reactor into more units.

Merely by way of example, the system described herein can be used for various purposes such as line-voltage regulation, capacitor control, transmission lines, motor controls, etc. The poly-unit saturable reactor of this invention has the electrical property of a variable inductance since it can be designed to draw at a certain supply voltage, a sinusoidal current of a controllable amplitude.

It is to be understood that various details of arrangement can be changed without departing from the spirit of the invention except as defined in the appended claims.

What is claimed is:

1. An adjustable reactor having $n$ number of phases and including at least three saturable magnetic cores, $n$ phase groups of load winding means, the load winding means in a phase group being connected only in series, control windings, and only $2n$ reactor load current terminals, the terminals being located at the ends of each group, means for connecting alternating current with said load winding terminals, and means connecting a source of direct current and said control windings in series with each other, each of said reactors having its turns and core area related to the turns and core area of the others, so that once during each cycle of said alternating current, the cores of at least some of said reactors pass from a saturated condition in one direction of magnetization to a saturated condition in the opposite direction of magnetization, the cores returning to a saturated condition in the first direction within said cycle of said alternating current, the cores making the transition from a saturated condition in one direction to a saturated condition in the opposite direction in a predetermined sequence and during intervals of time of predetermined length, at least one core being in the state of transition from one saturated condition to the other and there being some cores in a saturated condition.

2. In a polyphase adjustable saturable reactor system, the combination including not less than three saturable reactors, each having a plurality of load windings and control winding means, all windings on each of said reactors being linked by essentially the same flux, and means connecting said load windings in series relationship only in a phase group with the phases of a source of polyphase alternating current, each of the phases including the series connected load windings phase group being substantially identical to very other phase, there being electrical connections between the load winding means of an individual phase group and the load winding means of any other phase group and the external circuit only at the end terminals of each individual phase group, means connecting said control winding means with a direct current control circuit, said reactors having the turns ratios and core areas related so that at least two predetermined reactors will be unsaturated at a time to provide a predetermined load current pattern in the various phases.

3. In a polyphase adjustable saturable reactor system, the combination including not less than three saturable reactors, each having control winding means and a plurality of load winding means on its core so located that essentially the same flux links all windings on an individual reactor, means for connecting said control winding means to a source of direct current, and means for connecting the load windings to a source of polyphase alternating current so that all the load windings on the several reactors which are connected to a given phase of the supply of alternating current are connected only in series with each other in a phase group and each reactor has at least two load windings which are connected to different phases of the supply of alternating current, each of the phases including the series connected load windings being substantially identical to every other phase, there being electrical connections between the load windings of an individual phase group and the load windings of any other phase group and the external circuit at the end terminals only of each individual phase group, the turns and core areas of each of said reactors being so proportioned relative to each other that at all times when said alternating current is applied to the load winding means, there will be at least two reactors in the state of changing from saturation in one direction of magnetization to saturation in the opposite direction of magnetization, the turns on the reactors in said state of change bearing such relationship to each other so that currents will flow in the load windings, the magnitude of said currents being equal to the respective magnitudes of the desired currents for the time interval during which said state of change exists.

4. In a polyphase saturable reactor system, the combination including not less than three saturable reactors, each having a plurality of load winding means on its core so located that essentially the same flux links all windings on an individual reactor, and means for connecting the load windings on each reactor to different phases of a source of polyphase alternating current so that all the load windings on the several reactors which are connected to a given phase of the supply of alternating current are connected only in series with each other in a phase group and each reactor has at least two load windings which are connected to different phases of the supply of alternating current, there being electrical connections between the load windings of an individual phase group and the load windings of any other phase group and the external circuit at the end terminals only of each individual phase group, the turns and core areas of each of said reactors being so proportioned relative to each other that at all times when said alternating current is applied to the load winding means, there will be at least two reactors in the state of changing from saturation in one direction of magnetization to saturation in the opposite direction of magnetization, the turns on the reactors in said state of change bearing such relationship to each other so that currents will flow in the load windings, the magnitude of said currents being equal to the respective magnitudes of the desired currents for the time interval during which said state of change exists.

References Cited in the file of this patent

UNITED STATES PATENTS

| | | |
|---|---|---|
| 2,662,210 | Forssell | Dec. 8, 1953 |
| 2,742,613 | Sontheimer | Apr. 17, 1956 |

FOREIGN PATENTS

| | | |
|---|---|---|
| 611,510 | Germany | Apr. 4, 1935 |